(12) United States Patent
Wu et al.

(10) Patent No.: US 9,524,056 B2
(45) Date of Patent: Dec. 20, 2016

(54) CAPACITIVE VOLTAGE INFORMATION SENSING CIRCUIT AND RELATED ANTI-NOISE TOUCH CIRCUIT

(71) Applicant: Sitronix Technology Corp., Hsinchu County (TW)

(72) Inventors: Chun-Kuan Wu, Hsinchu County (TW); Ching-Jen Tung, Hsinchu County (TW); Chen-Yuan Yang, Hsinchu County (TW); Chun-Yu Lin, Hsinchu County (TW)

(73) Assignee: Sitronix Technology Corp., Hsinchu County (TW)

( * ) Notice: Subject to any disclaimer, the term of this patent is extended or adjusted under 35 U.S.C. 154(b) by 195 days.

(21) Appl. No.: 14/509,069

(22) Filed: Oct. 8, 2014

(65) Prior Publication Data

US 2015/0378511 A1   Dec. 31, 2015

(30) Foreign Application Priority Data

Jun. 26, 2014 (TW) .............................. 103122112 A

(51) Int. Cl.
*G06F 3/041* (2006.01)
*G06F 3/044* (2006.01)

(52) U.S. Cl.
CPC ............. *G06F 3/0418* (2013.01); *G06F 3/044* (2013.01)

(58) Field of Classification Search
CPC .. G06F 3/0418; G06F 3/044; G06F 2203/041; G06F 3/03547; G06F 3/041; G06F 3/0412; G06F 3/0414; G06F 3/0416; G06F 3/046; G06F 3/047; G06F 2203/04107; H05K 9/0073; H05K 9/0079; H05K 9/0081; H05K 9/0088; H05K 345/173; H05K 345/174

(Continued)

(56) References Cited

U.S. PATENT DOCUMENTS 6,473,075 B1 * 10/2002 Gomes .................. G06F 3/0418
                                                            178/18.04
6,937,025 B1 *  8/2005 Fong ...................... G01R 19/25
                                                            324/522

(Continued)

FOREIGN PATENT DOCUMENTS

CN          202177879 U      3/2012
KR   WO 2014042489 A2 *      3/2014    ........... G06F 3/0418

(Continued)

*Primary Examiner* — Grant Sitta
(74) *Attorney, Agent, or Firm* — Winston Hsu; Scott Margo

(57) ABSTRACT

The present disclosure provides a capacitor voltage information sensing circuit. The capacitor voltage information sensing circuit includes a mixer and an analog filter. The mixer includes a first input terminal for receiving a reference signal, a second input terminal for receiving a voltage signal, the voltage signal includes capacitor voltage information and a noise when a touch occurs, a first output terminal for outputting a first differential signal according to the voltage signal and the reference signal, and a second output terminal for outputting a second differential signal according to the voltage signal and the reference signal. The analog filter is coupled to the mixer for generating a first low-frequency signal and a second low-frequency signal according to the first differential signal and second differential signal.

13 Claims, 8 Drawing Sheets

(58) Field of Classification Search
USPC .......................................................... 345/173
See application file for complete search history.

(56) References Cited

U.S. PATENT DOCUMENTS

| | | | | |
|---|---|---|---|---|
| 7,865,164 B2* | 1/2011 | Xu | ....................... | H03D 7/1441 |
| | | | | 455/323 |
| 8,054,299 B2* | 11/2011 | Krah | .................... | G06F 3/0416 |
| | | | | 178/18.06 |
| 8,711,129 B2* | 4/2014 | Hotelling | .............. | G06F 3/0418 |
| | | | | 178/18.01 |
| 8,743,080 B2* | 6/2014 | Hargreaves | ............ | G08C 19/12 |
| | | | | 345/174 |
| 8,952,891 B2* | 2/2015 | Tanbakuchi | ........... | B82Y 35/00 |
| | | | | 324/658 |
| 9,310,916 B2* | 4/2016 | Krah | .................... | G06F 3/0412 |
| 2003/0007377 A1* | 1/2003 | Otaka | ................. | H03D 7/1425 |
| | | | | 363/127 |
| 2003/0058011 A1* | 3/2003 | Marotta | ............... | H03K 17/223 |
| | | | | 327/143 |
| 2006/0274906 A1* | 12/2006 | Jia | ......................... | G06F 3/0433 |
| | | | | 381/119 |
| 2007/0258083 A1* | 11/2007 | Heppell | ............. | A61B 5/14532 |
| | | | | 356/39 |
| 2008/0062155 A1* | 3/2008 | Wang | ................... | G09G 3/3648 |
| | | | | 345/204 |
| 2008/0309625 A1* | 12/2008 | Krah | ....................... | G06F 3/041 |
| | | | | 345/173 |
| 2009/0108914 A1* | 4/2009 | Zhang | ................. | H03K 17/962 |
| | | | | 327/517 |
| 2009/0224776 A1* | 9/2009 | Keith | .................... | H03K 17/962 |
| | | | | 324/686 |
| 2009/0322351 A1* | 12/2009 | McLeod | ............... | G06F 3/0416 |
| | | | | 324/658 |
| 2011/0012618 A1* | 1/2011 | Teterwak | ................. | G01D 5/24 |
| | | | | 324/607 |
| 2011/0063993 A1* | 3/2011 | Wilson | .................... | G06F 3/044 |
| | | | | 370/254 |
| 2011/0069023 A1* | 3/2011 | Kwak | ...................... | G06F 3/041 |
| | | | | 345/173 |
| 2011/0279131 A1* | 11/2011 | Kim | ......................... | G06F 3/044 |
| | | | | 324/679 |
| 2013/0033442 A1* | 2/2013 | Chu | ......................... | G06F 3/044 |
| | | | | 345/173 |
| 2013/0278538 A1* | 10/2013 | Brunet | ..................... | G06F 3/044 |
| | | | | 345/174 |
| 2014/0028634 A1* | 1/2014 | Krah | ...................... | G06F 3/041 |
| | | | | 345/179 |
| 2014/0049266 A1* | 2/2014 | Heim | ................... | G01R 35/005 |
| | | | | 324/603 |
| 2015/0054774 A1* | 2/2015 | Fergusson | ................ | G01B 7/14 |
| | | | | 345/174 |
| 2015/0277660 A1* | 10/2015 | Yang | ..................... | G06F 3/0418 |
| | | | | 345/173 |
| 2016/0054853 A1* | 2/2016 | Hu | ......................... | G06F 3/0412 |
| | | | | 345/174 |

FOREIGN PATENT DOCUMENTS

| | | |
|---|---|---|
| TW | 201007176 | 2/2010 |
| TW | 201030589 | 8/2010 |
| TW | M448020 | 3/2013 |

\* cited by examiner

CAPACITIVE VOLTAGE INFORMATION SENSING CIRCUIT AND RELATED ANTI-NOISE TOUCH CIRCUIT

BACKGROUND OF THE INVENTION

1. Field of the Invention

The present invention relates to a capacitive voltage information sensing circuit and related anti-noise touch circuit, and more particularly, to a capacitive voltage information sensing circuit and related anti-noise touch circuit utilized for a capacitive touch panel.

2. Description of the Prior Art

Since touch display devices provide users a more intuitive and convenient operation method, the touch display devices are widely applied in numerous consuming electronic devices. Generally speaking, a touch display device comprises a display and a transparent touch pad. By attaching the transparent touch pad to the display, touch controls and display operations are realized. In current applications, capacitive touch technology is the most popular touch technology.

The operational principle of the capacitive touch panel is to utilize indium tin oxide (ITO) transparent electrodes on the touch panel and human fingers or conducting material forming a sensing capacitor when a touch occurs, computed by control IC, and to convert as coordinate information which is read by operation system.

Touch circuits of the current capacitive touch panel comprise signal paths and noise paths. The signal paths have to be realized by complicated circuit such as samplers, multiple switches, etc. Within the sampling process, noise out of signal bandwidth would be folded after the sampling process and thus enter the signal bandwidth, such that the original signal is affected, i.e., the noise folding phenomenon. In addition, the noise paths have disadvantages such as too complicated circuits, longer update period, etc.

SUMMARY OF THE INVENTION

It is therefore a primary objective of the present invention to provide a capacitive voltage information sensing circuit.

The present invention discloses a capacitor voltage information sensing circuit, comprising a mixer, comprising a first input terminal, configured to receive a reference signal; a second input terminal, configured to receive a voltage signal, wherein the voltage signal comprises a capacitor voltage information and a noise when a touch occurs; a first output terminal, configured to output a first differential signal according to the voltage signal and the reference signal; and a second output terminal, configured to output a second differential signal according to the voltage signal and the reference signal; and an analog filter, coupled to the mixer, configured to generate a first low-frequency signal and a second low-frequency signal according to the first differential signal and the second differential signal; wherein the capacitor voltage information sensing circuit obtains the capacitor voltage information according to the first low-frequency signal and the second low-frequency signal.

The present invention further discloses an anti-noise touch circuit for a capacitive touch panel, comprising a capacitor voltage information sensing circuit, comprising a mixer, comprising a first input terminal, configured to receive a reference signal; a second input terminal, configured to receive a voltage signal, wherein the voltage signal comprises a capacitor voltage information and a noise when a touch occurs; a first output terminal, configured to output a first differential signal according to the voltage signal and the reference signal; and a second output terminal, configured to output a second differential signal according to the voltage signal and the reference signal; and an analog filter, coupled to the mixer, configured to generate a first low-frequency signal and a second low-frequency signal according to the first differential signal and the second differential signal; wherein the capacitor voltage information sensing circuit obtains the capacitor voltage information according to the first low-frequency signal and the second low-frequency signal; a noise detection circuit, configured to detect the noise, the noise detection circuit comprising a sampling unit, coupled to the mixer, configured to sample the first differential signal and the second differential signal, the sampling unit comprising a third input terminal, configured to receive the first differential signal; a fourth input terminal, configured to receive the second differential signal; a third output terminal, configured to output a first sampled signal according to the first differential signal; and a fourth output terminal, configured to output a second sampled signal according to the second differential signal; and a comparator unit, coupled to the sampling unit, configured to generate a plurality of comparison results according to the first sampled signal, the second sampled signal and a plurality of threshold values, to determine whether the noise is detected.

The present invention further discloses an anti-noise touch circuit for a capacitive touch panel, comprising a capacitor voltage information sensing circuit, comprising a mixer, comprising a first input terminal, configured to receive a reference signal; a second input terminal, configured to receive a voltage signal, wherein the voltage signal comprises a capacitor voltage information and a noise when a touch occurs; a first output terminal, configured to output a first differential signal according to the voltage signal and the reference signal; and a second output terminal, configured to output a second differential signal according to the voltage signal and the reference signal; and an analog filter, coupled to the mixer, configured to generate a first low-frequency signal and a second low-frequency signal according to the first differential signal and the second differential signal; wherein the capacitor voltage information sensing circuit obtains the capacitor voltage information according to the first low-frequency signal and the second low-frequency signal; a noise detection circuit, configured to detect the noise, the noise detection circuit comprising a sampling unit, coupled to the mixer, configured to sample the first differential signal and the second differential signal, the sampling unit comprising a third input terminal, configured to receive the voltage signal; a fourth input terminal, configured to receive the voltage signal; a third output terminal, configured to output a first sampled signal according to the voltage signal; and a fourth output terminal, configured to output a second sampled signal according to the voltage signal; and a comparator unit, coupled to the sampling unit, configured to generate a plurality of comparison results according to the first sampled signal, the second sampled signal and a plurality of threshold values, to determine whether the noise is detected.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
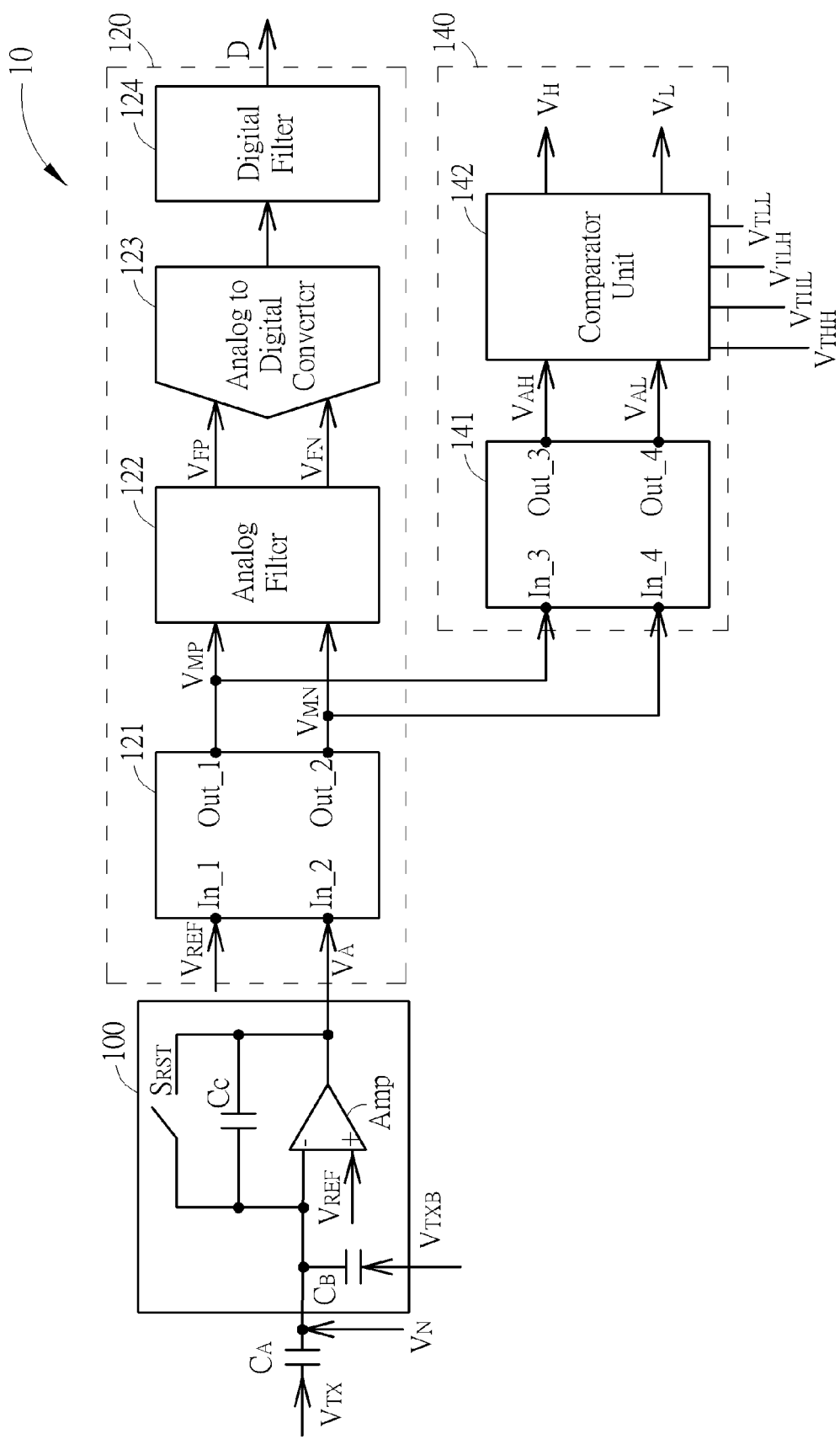
FIG. 1 is a schematic diagram of an anti-noise touch circuit according to an embodiment of the invention.

Please refer to FIG. 1, which is a schematic diagram of an anti-noise touch circuit 10 according to an embodiment of the present invention. The anti-noise touch circuit 10 is utilized in a capacitive touch panel. When a touch occurs, the anti-noise touch circuit 10 is configured to obtain a capacitor voltage information $V_S$ (not shown in FIG. 1) generated by the touch and detect a noise $V_N$. The anti-noise touch circuit 10 comprises a capacitor $C_A$, a touch sensing circuit 100, a capacitor voltage information sensing circuit 120 and a noise detection circuit 140. The capacitor $C_A$ generates a capacitance variation $\Delta C$ when the touch occurs. The capacitor $C_A$ comprises a first terminal configured to receive a clock signal $V_{TX}$ and a second terminal. The touch sensing circuit 100 generates the capacitor voltage information $V_S$ corresponding to the capacitance variation $\Delta C$ when the touch occurs. In the embodiment of the present invention, the capacitor voltage information $V_S$ is proportional to the capacitance variation $\Delta C$. The touch sensing circuit 100 comprises an amplifier Amp, a switch $S_{RST}$ and capacitors $C_B$, $C_C$. The amplifier Amp comprises a positive input terminal configured to receive a reference signal $V_{REF}$, a negative input terminal coupled to the second terminal of the capacitor $C_A$, and an output terminal configured to output a voltage signal $V_A$. The capacitor $C_B$ comprises a first terminal configured to receive a clock signal $V_{TXB}$ and a second terminal coupled to the negative input terminal of the amplifier Amp. Moreover, the clock signal $V_{TXB}$ is an inverse of the clock signal $V_{TX}$. The capacitor $C_C$ and the switch $S_{RST}$ are coupled to the negative input terminal and the output terminal of the amplifier Amp.

Due to external interference of the touch panel (e.g., interference from display devices and from the charger), the touch sensing circuit 100 receives the noise $V_N$, which enters the negative input terminal of the amplifier Amp through the second terminal of the capacitor $C_B$. In such a situation, when the touch occurs, the voltage signal $V_A$ incorporates the capacitor voltage information $V_S$ and the noise $V_N$. In addition, if there are no touch and external interference (i.e., the noise $V_N$), the voltage signal $V_A$ equals the reference signal $V_{REF}$.

The capacitor voltage information sensing circuit 120 comprises a mixer 121, an analog filter 122, an analog to digital converter 123 and a digital filter 124. The mixer 121 comprises input terminals In_1, In_2, and output terminals Out_1, Out_2. The input terminal In_1 is configured to receive the reference signal $V_{REF}$. The input terminal In_2 is configured to receive the voltage signal $V_A$. The output terminals Out_1 and Out_2 are configured to respectively output differential signals $V_{MP}$ and $V_{MN}$ according to the reference signal $V_{REF}$ and the voltage signal $V_A$. The analog filter 122 is coupled to the mixer 121, configured to acquire low-frequency signals $V_{FP}$ and $V_{FN}$ according to the differential signals $V_{MP}$ and $V_{MN}$, and acquires the capacitor voltage information $V_S$ according to the low-frequency signals $V_{FP}$ and $V_{FN}$. Preferably, frequencies of the low-frequency signals $V_{FP}$ and $V_{FN}$ are close to a direct current (DC) frequency. The analog to digital converter 123 and the digital filter 124 convert the capacitor voltage information $V_S$ into a digital signal D, and the digital signal D is sent to a chip. Therefore, the capacitor voltage information sensing circuit 120 of the present invention utilizes the differential signals $V_{MP}$ and $V_{MN}$ to eliminate the noise $V_N$ incorporated in the voltage signal $V_A$, and further acquires the capacitor voltage information $V_S$. Since the differential signals $V_{MP}$ and $V_{MN}$ are employed, there is no need for complicated capacitor switching. A need for analog buffer and sampler is eliminated, and the noise folding phenomenon is further avoided.

The noise detection circuit 140 is coupled to the mixer 121 of the capacitor voltage information sensing circuit 120, configured to detect the noise $V_N$. The noise detection circuit 140 comprises a sampling unit 141 and a comparator unit 142. The sampling unit 141 is coupled to the mixer 121, and comprises input terminals In_3, In_4, and output terminals Out_3, Out_4. The input terminals In_3 and In_4 are configured to respectively receive the differential signals $V_{MP}$ and $V_{MN}$. The output terminals Out_3 and Out_4 are configured to output sampled signals $V_{AH}$ and $V_{AL}$ according to the differential signals $V_{MP}$ and $V_{MN}$, respectively. The comparator unit 142 is coupled to the sampling unit 141, configured to generate comparison results $V_H$ and $V_L$ according to the sampled signals $V_{AH}$, $V_{AL}$, high threshold values $V_{THH}$, $V_{THL}$, and low threshold values $V_{TLH}$, $V_{TLL}$, and determines whether the noise $V_N$ is detected according to the comparison results $V_H$ and $V_L$. Since the noise detection circuit 140 executes operations of signal addition by the comparator unit 142, complicated capacitor switching is avoided.

Figure 2:
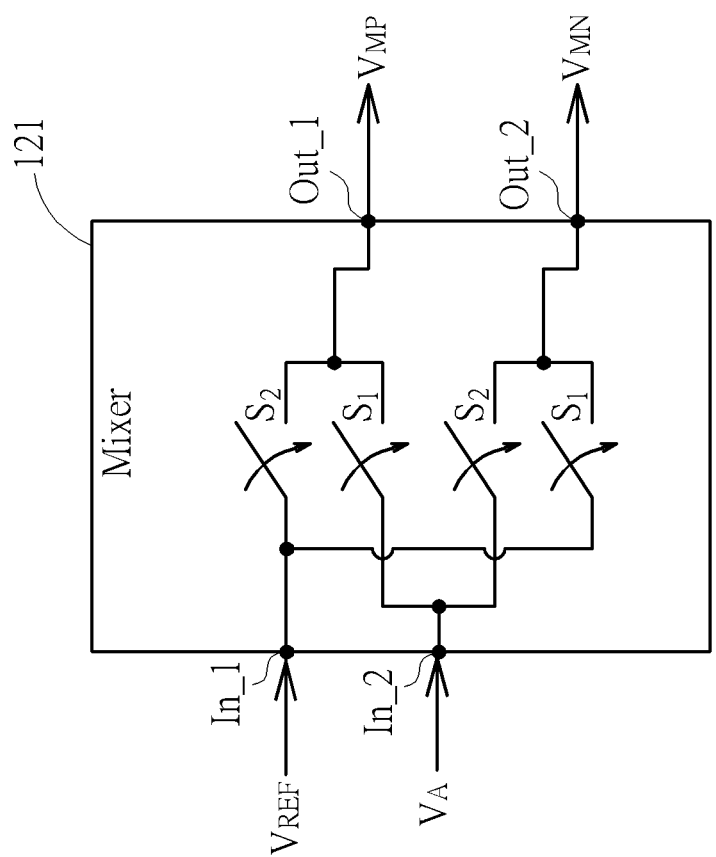
FIG. 2 is a schematic diagram of a mixer 121 in FIG. 1.

Please refer to FIG. 2, which is a schematic diagram of the mixer 121 according to an embodiment of the present invention. The mixer 121 comprises a pair of switches $S_1$ and a pair of switches $S_2$. The switches $S_1$ are coupled to the input terminals In_1 and In_2, and configured to receive the reference signal $V_{REF}$ and the voltage signal $V_A$. The switches $S_1$ are periodically conducted and cut off, to generate the differential signals $V_{MP}$ and $V_{MN}$ according to the reference signal $V_{REF}$ and the voltage signal $V_A$. The switches $S_2$ are coupled to the input terminals In_1 and In_2, and configured to receive the reference signal $V_{REF}$ and the voltage signal $V_A$. The switches $S_2$ are periodically conducted and cut off, to generate the differential signals $V_{MP}$ and $V_{MN}$ according to the reference signal $V_{REF}$ and the voltage signal $V_A$. The switches $S_2$ are cut off when the switches $S_1$ are conducted. The switches $S_2$ are conducted when the switches $S_1$ are cutoff. The switches $S_1$ being conducted and the switches $S_2$ being conducted differ in a time period t. Preferably, the switches $S_1$ and the switches $S_2$ are conducted periodically with a period T. The time t is one half of the period T, i.e., t=T/2. In such a situation, the differential signal $V_{MP}$ and the differential signal $V_{MN}$ differ in one half of the period (T/2).

Figure 3:
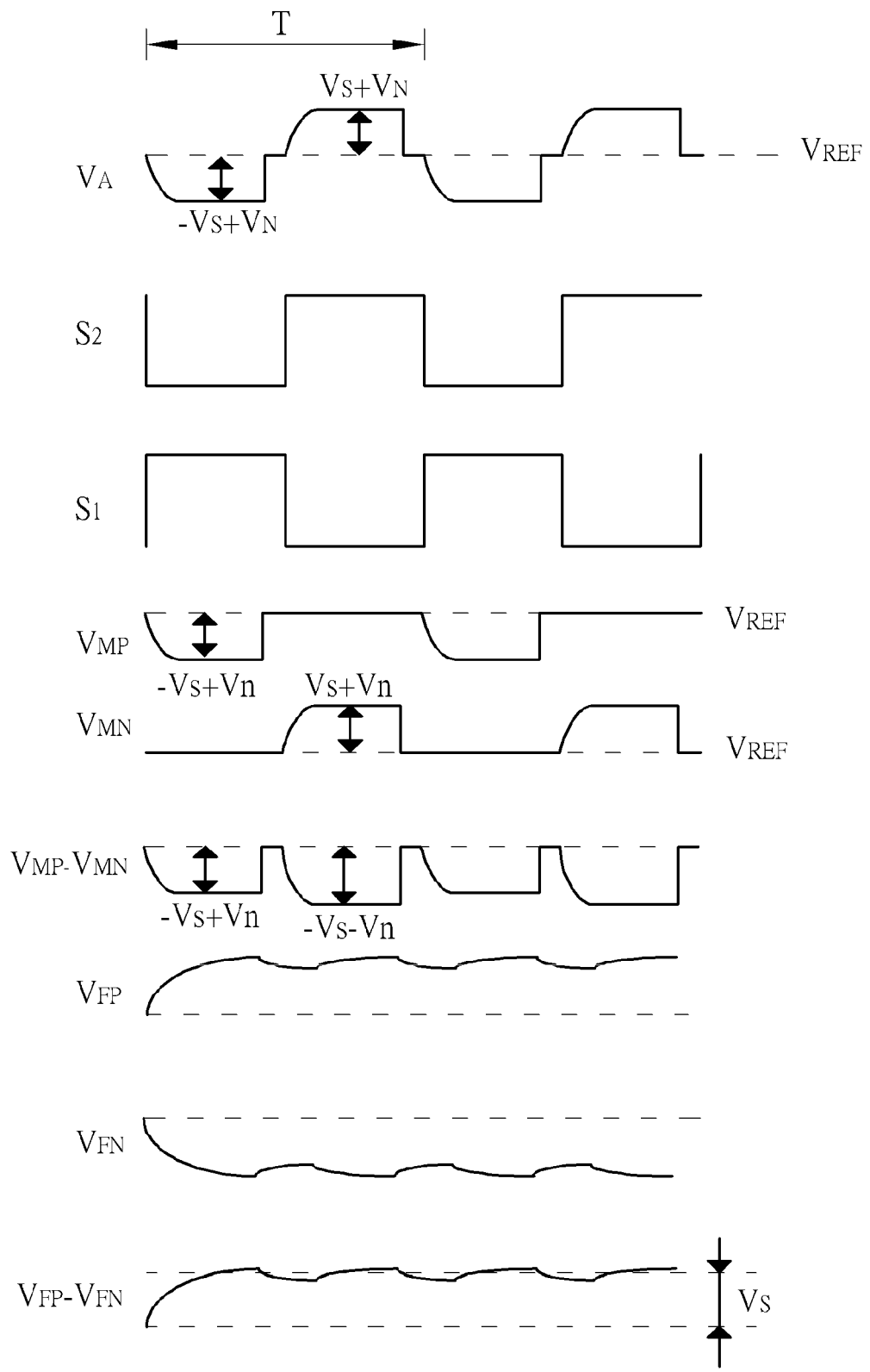
FIG. 3 is a schematic diagram illustrating waveforms of a plurality of signals according to an embodiment of the present invention.

Please refer to FIG. 3, which is a schematic diagram illustrating waveforms of a plurality of signals according to an embodiment of the present invention. As shown in FIG. 3, when the touch occurs, the touch sensing circuit 100 outputs the voltage signal $V_A$ incorporating the capacitor voltage information $V_S$ and the noise $V_N$. The mixer 121 receives the reference signal $V_{REF}$ and the voltage signal $V_A$. When the switches $S_1$ are conducted and the switches $S_2$ are cut off, the differential signal $V_{MP}$ equals the voltage signal $V_A$, and the differential signal $V_{MN}$ equals the reference signal $V_{REF}$. When the switches $S_2$ are conducted and the switches $S_1$ are cut off, the differential signal $V_{MP}$ equals the reference signal $V_{REF}$, and the differential signal $V_{MN}$ equals the voltage signal $V_A$. The analog filter 122 acquires the low-frequency signals $V_{FP}$ and $V_{FN}$ according to the differential signals $V_{MP}$ and $V_{MN}$. In addition, as shown in FIG. 3, the capacitor voltage information sensing circuit 120 obtains the capacitor voltage information $V_S$ by performing mutually subtraction on the low-frequency signals $V_{FP}$ and $V_{FN}$.

Figure 4:
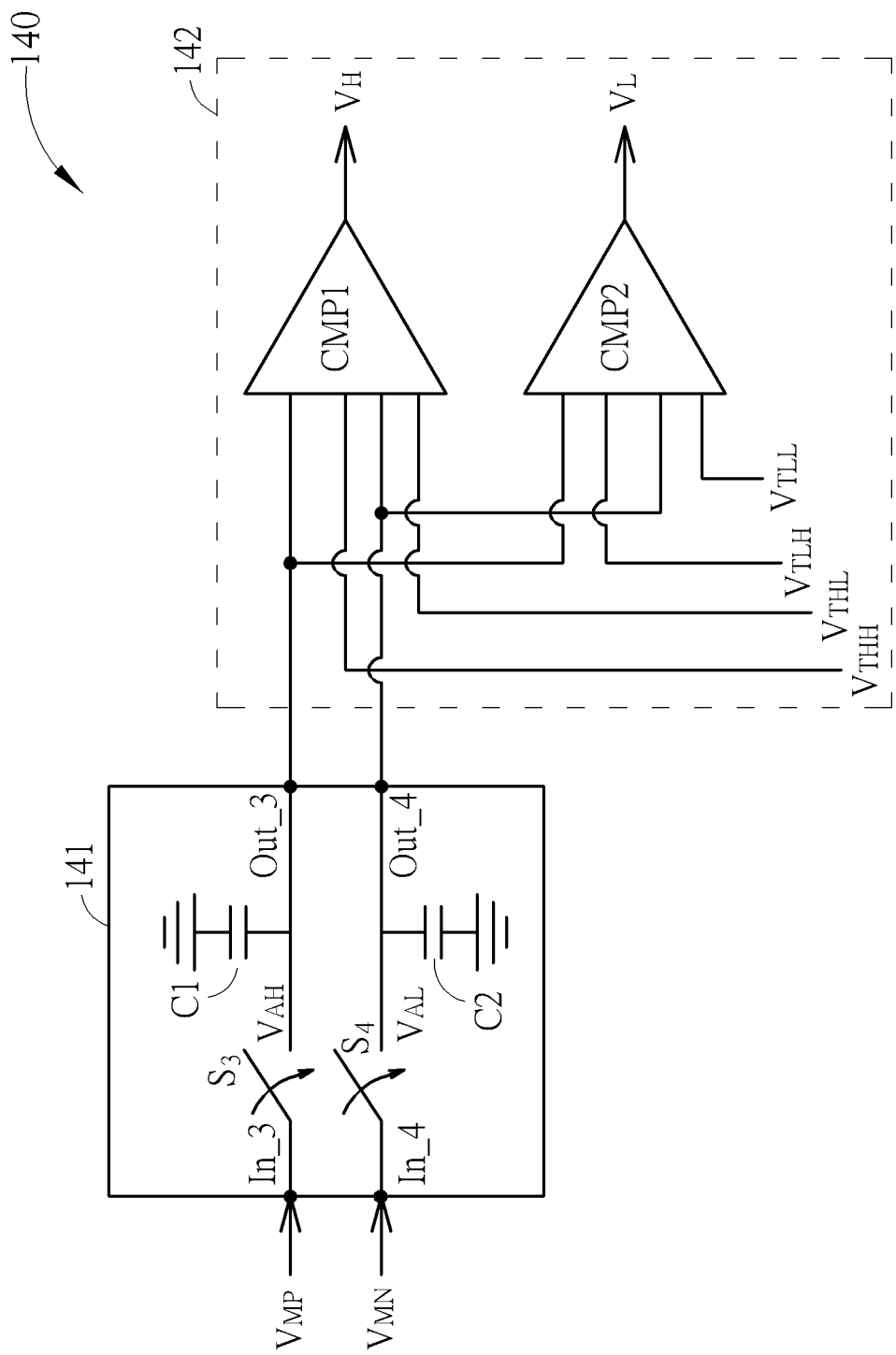
FIG. 4 is a schematic diagram of a noise detection circuit 140 in FIG. 1.

Please refer to FIG. 4, which is a schematic diagram of the noise detection circuit 140 according to an embodiment of the present invention. The sampling unit 141 comprises switches $S_3$, $S_4$, and capacitors C1, C2. The comparator unit 142 comprises comparators CMP1, CMP2. When the input terminals In_3 and In_4 respectively receive the differential signals $V_{MP}$ and $V_{MN}$, the switches $S_3$ and $S_4$ are periodically conducted and cut off, to generate the sampled signals $V_{AH}$ and $V_{AL}$ according to the differential signals $V_{MP}$ and $V_{MN}$. When the switch $S_3$ are conducted, the differential signal $V_{MP}$ charges the capacitor C1; when the switch $S_4$ is conducted, the differential signal $V_{MN}$ charges the capacitor C2. The capacitors C1 and C2 store voltage values of the differential signals $V_{MP}$ and $V_{MN}$, and output the sampled signals $V_{AH}$ and $V_{AL}$, respectively. Preferably, a sampling period of the switches $S_3$ and $S_4$ are the period T stated in the above. The comparator CMP1 is configured to compare an average value $V_{ACM}$ of the sampled signals $V_{AH}$ and $V_{AL}$ with an average value $V_{TH}$ of the high threshold values $V_{THH}$ and $V_{THL}$, to generate the comparison result $V_H$. The comparator CMP2 is configured to compare the average value $V_{ACM}$ with an average value $V_{TL}$ of the low threshold values $V_{TLH}$ and $V_{TLL}$, to generate the comparison result $V_L$. When the average value $V_{ACM}$ is greater than the average value $V_{TH}$, the comparison results $V_H$ and $V_L$ are "1", to determine that the noise $V_N$ is detected. When the average value $V_{ACM}$ is smaller than the average value $V_{TL}$, the comparison results $V_H$ and $V_L$ are "0", to determine that the noise $V_N$ is detected. In other words, when the average value $V_{ACM}$ is greater than the average value $V_{TL}$ but smaller than the average value $V_{TH}$ (i.e., $V_H$ is "0", $V_L$ is "1"), it is determined that the noise $V_N$ is not detected.

In the embodiment of the present invention, the switch $S_4$ is cutoff when the switch $S_3$ is conducted, and the switch $S_4$ is conducted when the switch $S_3$ is cutoff. The switch $S_3$ being conducted and the switches $S_4$ being conducted differ in one half of the period T. Since the sampled signals $V_{AH}$ and $V_{AL}$ also differ in one half of the period T (T/2), the comparator CMP1 generates the comparison result $V_H$ during a former half period, and the comparator CMP2 generates the comparison result $V_L$ during a latter half period. Therefore, an update period of noise detection may be reduced as one half of the period (T/2). In comparison to the prior art, the noise detection circuit 140 of the present invention responds faster, and updates whether the noise $V_N$ is detected faster.

Figure 5:
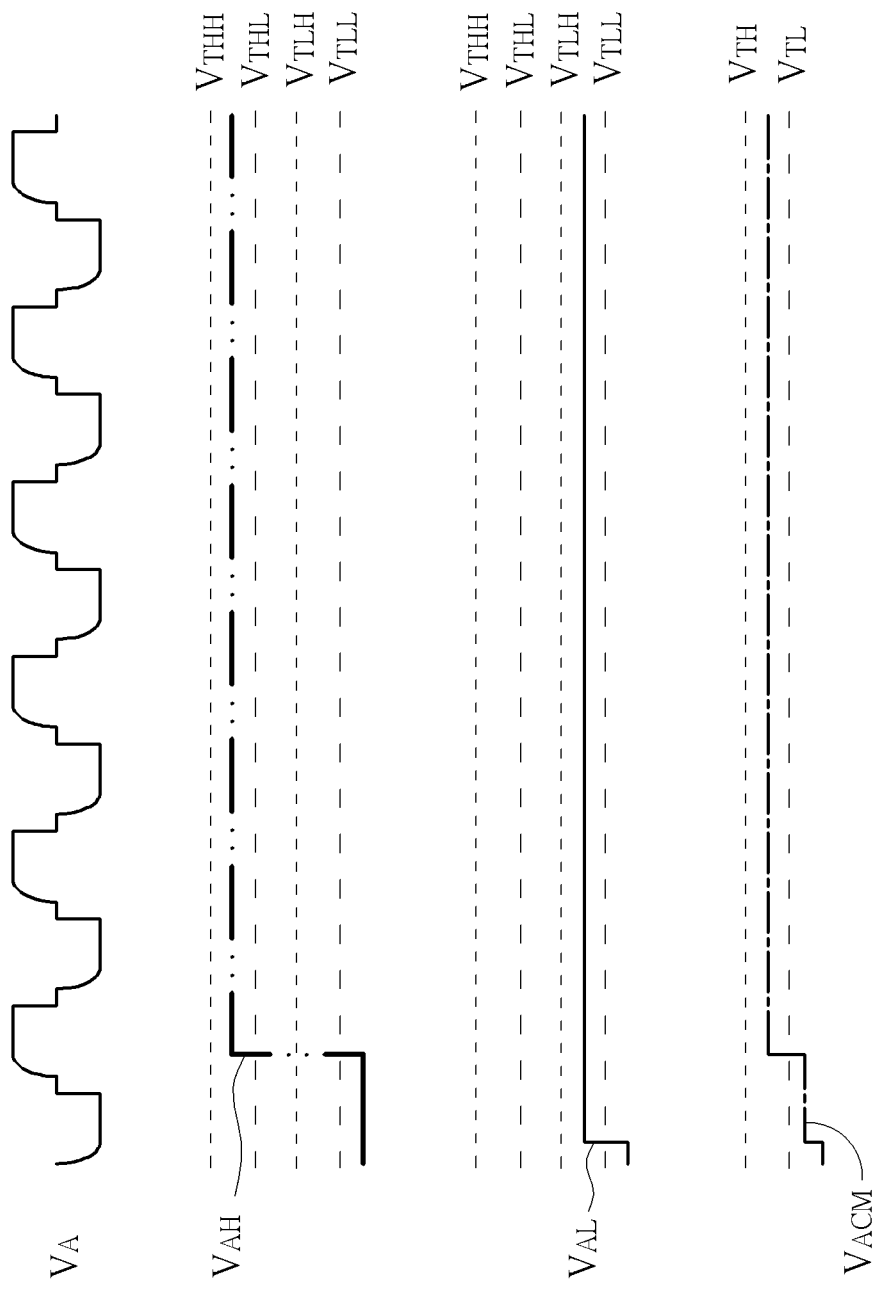
FIG. 5 is a schematic diagram illustrating waveforms of a plurality of signals without noise according to an embodiment of the present invention.

Please refer to FIG. 5, which is a schematic diagram illustrating waveforms of a plurality of signals without the noise $V_N$ according to an embodiment of the present invention. As shown in FIG. 5, the average value $V_{ACM}$ of the sampled signals is between the average value $V_{TH}$ of the high threshold values and the average value $V_{TL}$ of the low threshold values.

Figure 6:
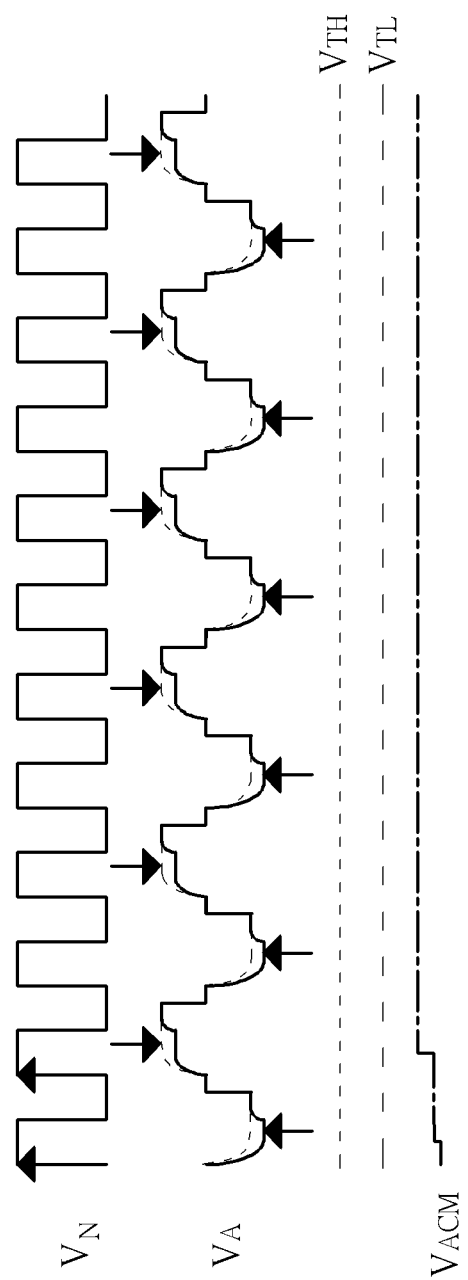
FIG. 6 is a schematic diagram illustrating waveforms of a plurality of signals when noise occurs according to an embodiment of the present invention.

Please refer to FIG. 6, which is a schematic diagram illustrating waveforms of a plurality of signals when the noise $V_N$ occurs according to an embodiment of the present invention. As shown in FIG. 6, a dashed line represents an original waveform of the voltage signal $V_A$, and a solid line represents the voltage signal $V_A$ affected by the noise $V_N$. The comparator CMP1 executes comparison and generates the comparison result $V_H$ at top arrows. The comparator CMP2 executes comparison and generates the comparison result $V_L$ at bottom arrows. Since the average value $V_{ACM}$ of the sampled signals is smaller than the average value $V_{TL}$ of the low threshold values, the comparison results $V_H$ and $V_L$ are "0", to determine that the noise $V_N$ is detected.

Figure 7:
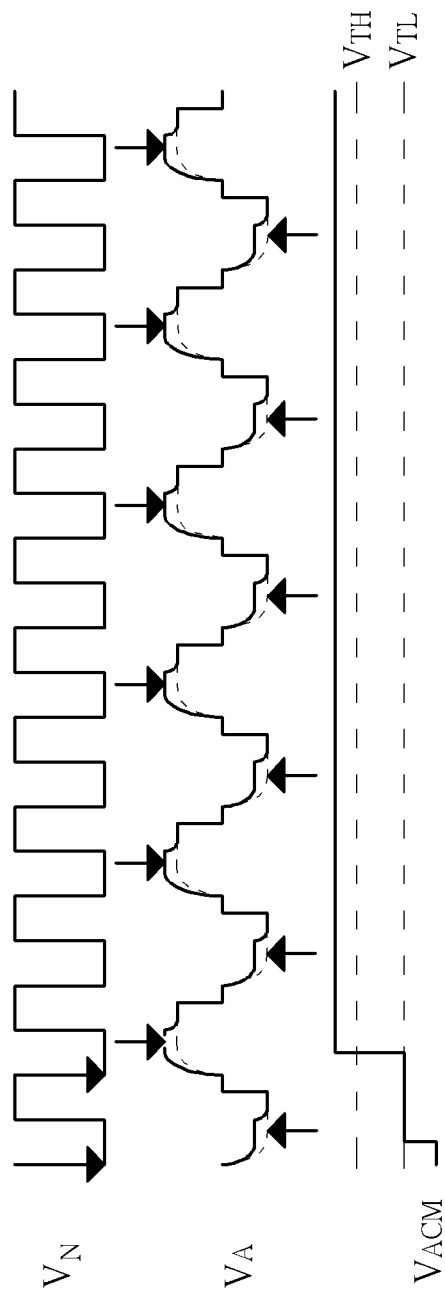
FIG. 7 is a schematic diagram illustrating waveforms of a plurality of signals when noise occurs according to an embodiment of the present invention.

Please refer to FIG. 7, which is a schematic diagram illustrating waveforms of the plurality of signals when the noise $V_N$ occurs according to an embodiment of the present invention. As shown in FIG. 7, a dashed line represents an original waveform of the voltage signal $V_A$, a solid line represents of the voltage signal $V_A$ affected by the noise $V_N$. The comparator CMP1 executes comparison and generates the comparison result $V_H$ at top arrows. The comparator CMP2 executes comparison and generates the comparison result $V_L$ at bottom arrows. Since the average value $V_{ACM}$ of the sampled signals is greater than the average value $V_{TH}$ of the high threshold values, the comparison results $V_H$ and $V_L$ are "1", to determine that the noise $V_N$ is detected.

Figure 8:
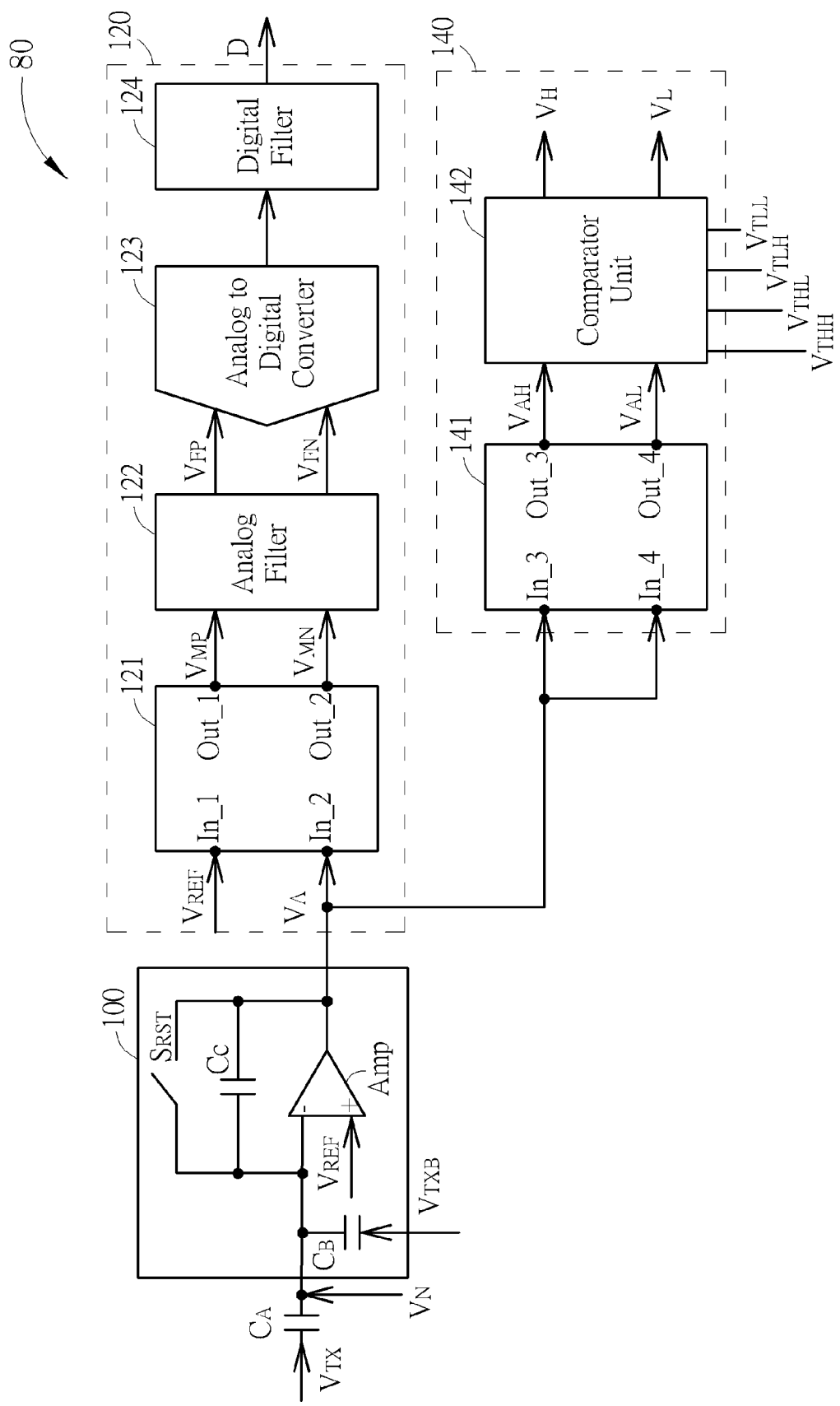
FIG. 8 is a schematic diagram of an anti-noise touch circuit according to an embodiment of the present invention.

In another perspective, the output terminals In_3 and In_4 of the noise detection circuit 140 are configured to receive the differential signals $V_{MP}$ and $V_{MN}$; in addition, the noise detection circuit 140 may be coupled to the touch sensing circuit 100 directly, and configured to receive the voltage signal $V_A$. Please refer to FIG. 8, which is a schematic diagram of an anti-noise touch circuit 80 according to an embodiment of the present invention. Except the noise detection circuit 140 directly coupled to the voltage signal $V_A$, a basis structure and functions of the anti-noise touch circuit 80 are similar to those of the anti-noise touch circuit 10. Detail operations of the anti-noise touch circuit 80 may be referred to the paragraph in the above, which are not narrated for brevity.

In summary, the capacitor voltage information sensing circuit of the present invention utilizes the differential signals to eliminate the noise, and further acquires the capacitor voltage information. Therefore, the complicated capacitor switching is no longer needed, the need for analog buffer and sampler is eliminated, and the noise folding phenomenon is further avoided. In addition, the noise detection circuit of the present invention executes the operations of signal addition by the comparators to avoid the complicated capacitor switching, which responds faster and updates whether the noise $V_N$ is detected faster.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A capacitor voltage information sensing circuit, comprising:
    a mixer, comprising:
        a first input terminal, configured to receive a reference signal;
        a second input terminal, configured to receive a voltage signal, wherein the voltage signal comprises a capacitor voltage information and a noise when a touch occurs;
        a first output terminal, configured to output a first differential signal according to the voltage signal and the reference signal; and
        a second output terminal, configured to output a second differential signal according to the voltage signal and the reference signal; and
    an analog filter, coupled to the mixer, configured to generate a first low-frequency signal and a second low-frequency signal according to the first differential signal and the second differential signal;
    wherein the mixer outputs the first differential signal as the voltage signal and outputs the second differential signal as the reference signal during a first period, and the mixer outputs the first differential signal as the reference signal and outputs the second differential signal as the voltage signal during a second period;
    wherein the capacitor voltage information sensing circuit obtains the capacitor voltage information according to the first low-frequency signal and the second low-frequency signal.

2. The capacitor voltage information sensing circuit of claim 1, further comprising an analog to digital converter and a digital filter.

3. The capacitor voltage information sensing circuit of claim 1, wherein the mixer further comprises:
    a pair of first switches, coupled to the first input terminal and the second input terminal, configured to be periodically conducted and cut off, to generate the first differential signal and the second differential signal according to the voltage signal and the reference signal; and
    a pair of second switches, coupled to the first input terminal and the second input terminal, configured to be periodically conducted and cut off, to generate the first differential signal and the second differential signal according to the voltage signal and the reference signal;
    wherein the pair of second switches are cut off when the pair of first switches are conducted, the pair of second switches are conducted when the pair of first switches are cut off, and the pair of first switches being conducted and the pair of second switches being conducted differ in a time period.

4. The capacitor voltage information sensing circuit of claim 3, wherein when the pair of first switches are conducted and the pair of second switches are cut off, the first differential signal equals the voltage signal, and the second differential signal equals the reference signal.

5. The capacitor voltage information sensing circuit of claim 3, wherein when the pair of second switches are conducted and the pair of first switches are cut off, the first differential signal equals the reference signal, and the second differential signal equals the voltage signal.

6. The capacitor voltage information sensing circuit of claim 1, wherein the capacitor voltage information is obtained by subtracting the second low-frequency signal from the first low-frequency signal.

7. An anti-noise touch circuit for a capacitive touch panel, comprising:
    a capacitor voltage information sensing circuit, comprising:
        a mixer, comprising:
            a first input terminal, configured to receive a reference signal;
            a second input terminal, configured to receive a voltage signal, wherein the voltage signal comprises a capacitor voltage information and a noise when a touch occurs;
            a first output terminal, configured to output a first differential signal according to the voltage signal and the reference signal; and
            a second output terminal, configured to output a second differential signal according to the voltage signal and the reference signal; and
        an analog filter, coupled to the mixer, configured to generate a first low-frequency signal and a second low-frequency signal according to the first differential signal and the second differential signal;
        wherein the mixer outputs the first differential signal as the voltage signal and outputs the second differential signal as the reference signal during a first period, and the mixer outputs the first differential signal as the reference signal and outputs the second differential signal as the voltage signal during a second period;
        wherein the capacitor voltage information sensing circuit obtains the capacitor voltage information according to the first low-frequency signal and the second low-frequency signal;
    a noise detection circuit, configured to detect the noise, the noise detection circuit comprising:
        a sampling unit, coupled to the mixer, configured to sample the first differential signal and the second differential signal, the sampling unit comprising:
            a third input terminal, configured to receive the first differential signal;
            a fourth input terminal, configured to receive the second differential signal;
            a third output terminal, configured to output a first sampled signal according to the first differential signal; and
            a fourth output terminal, configured to output a second sampled signal according to the second differential signal; and
        a comparator unit, coupled to the sampling unit, configured to generate a plurality of comparison results according to the first sampled signal, the second sampled signal and a plurality of threshold values, to determine whether the noise is detected.

8. The anti-noise touch circuit of claim 7, wherein the sampling unit further comprises:
    a third switch, coupled to the first output terminal, configured to be periodically conducted and cut off, to generate the first sampled signal according to the first differential signal; and a fourth switch, coupled to the second output terminal, configured to be periodically conducted and cut off, to generate the second sampled signal according to the second differential signal.

9. The anti-noise touch circuit of claim 7, wherein the comparator unit comprises:
a first comparator, coupled to the third output terminal and the fourth output terminal, configured to compare an average value of the first sampled signal and the second sampled signal with an average value of a first high threshold value and a second high threshold value, to generate a first comparison result; and
a second comparator, coupled to the third output terminal and the fourth output terminal, configured to compare the average value of the first sampled signal and the second sampled signal with an average value of a first low threshold value and a second low threshold value, to generate a second comparison result.

10. The anti-noise touch circuit of claim 9, wherein when the first comparison result indicates that the average value of the first sampled signal and the second sampled signal is greater than the average value of the first high threshold value and the second high threshold value, the comparator unit determines that the noise is detected.

11. The anti-noise touch circuit of claim 9, wherein when the second comparison result indicates that the average value of the first sampled signal and the second sampled signal is smaller than the average value of the first low threshold value and the second low threshold value, the comparator unit determines that the noise is detected.

12. The anti-noise touch circuit of claim 7, further comprising:
a first capacitor, configured to generate a capacitance variation when a touch occurs, the first capacitor comprising:
a first terminal, configured to receive a first clock signal; and
a second terminal, configured to receive the noise;
a touch sensing circuit, configured to generate the capacitor voltage information corresponding to the capacitance variation when the touch occurs, the touch sensing circuit comprising:
an amplifier, comprising:
a positive input terminal, configured to receive the reference signal;
a negative input terminal, coupled to the second terminal of the first capacitor; and
an output terminal, configured to output the voltage signal;
a second capacitor, comprising:
a first terminal, configured to receive a second clock signal; and
a second terminal, coupled to the negative input terminal of the amplifier;
a third capacitor, coupled to the negative input terminal of the amplifier and the output terminal; and
a switch, coupled to the negative input terminal and the output terminal.

13. An anti-noise touch circuit for a capacitive touch panel, comprising:
a capacitor voltage information sensing circuit, comprising:
a mixer, comprising:
a first input terminal, configured to receive a reference signal;
a second input terminal, configured to receive a voltage signal, wherein the voltage signal comprises a capacitor voltage information and a noise when a touch occurs;
a first output terminal, configured to output a first differential signal according to the voltage signal and the reference signal; and
a second output terminal, configured to output a second differential signal according to the voltage signal and the reference signal; and
an analog filter, coupled to the mixer, configured to generate a first low-frequency signal and a second low-frequency signal according to the first differential signal and the second differential signal;
wherein the mixer outputs the first differential signal as the voltage signal and outputs the second differential signal as the reference signal during a first period, and the mixer outputs the first differential signal as the reference signal and outputs the second differential signal as the voltage signal during a second period;
wherein the capacitor voltage information sensing circuit obtains the capacitor voltage information according to the first low-frequency signal and the second low-frequency signal;
a noise detection circuit, configured to detect the noise, the noise detection circuit comprising:
a sampling unit, coupled to the mixer, configured to sample the first differential signal and the second differential signal, the sampling unit comprising:
a third input terminal, configured to receive the voltage signal;
a fourth input terminal, configured to receive the voltage signal;
a third output terminal, configured to output a first sampled signal according to the voltage signal; and
a fourth output terminal, configured to output a second sampled signal according to the voltage signal; and
a comparator unit, coupled to the sampling unit, configured to generate a plurality of comparison results according to the first sampled signal, the second sampled signal and a plurality of threshold values, to determine whether the noise is detected.

* * * * *